United States Patent [19]

Grieser et al.

[11] Patent Number: 5,597,221
[45] Date of Patent: Jan. 28, 1997

[54] DRAWER ASSEMBLY HAVING INTERLOCKING MEMBERS

[75] Inventors: Jerry D. Grieser, Archbold; Richard A. Nelson, Napoleon; Gordon D. Schumacher; Thomas B. Warner, both of Archbold; David M. Dietrich, Napoleon, all of Ohio

[73] Assignee: Sauder Woodworking Co., Archbold, Ohio

[21] Appl. No.: 551,311

[22] Filed: Nov. 1, 1995

[51] Int. Cl.⁶ .................................................. A47B 88/04
[52] U.S. Cl. .................................. 312/348.1; 312/348.2; 312/348.4; 403/403; 403/231
[58] Field of Search ............................. 312/348.1, 348.2, 312/348.4; 403/403, 382, 205, 231

[56] References Cited

U.S. PATENT DOCUMENTS

| | | | |
|---|---|---|---|
| 2,842,420 | 7/1958 | Hansen et al. | 312/348.4 X |
| 3,273,952 | 9/1966 | Himelreich et al. | 312/348.4 X |
| 3,876,270 | 4/1975 | White | 312/348.1 |
| 3,901,572 | 8/1975 | Litchfield | 312/348.2 |
| 4,097,100 | 6/1978 | Sauder | 312/257 A |
| 4,120,551 | 10/1978 | Godtschalck | 312/348.1 |
| 4,191,439 | 3/1980 | Cohen | 312/348.2 |
| 4,279,455 | 7/1981 | Santo | 312/348.2 |
| 4,466,675 | 8/1984 | Ferdinand et al. | 312/384.1 X |
| 4,739,604 | 4/1988 | Rock et al. | 312/348.1 |
| 4,902,080 | 2/1990 | Berger | 312/348.4 |
| 5,439,285 | 8/1995 | Luatenschlager | 312/348.1 |

FOREIGN PATENT DOCUMENTS

| | | | |
|---|---|---|---|
| 2190830 | 12/1987 | United Kingdom | 312/348.4 |

OTHER PUBLICATIONS

Brochure entitled "The Catalina Collection, Model #7815, 5–Drawer Chest", Sauder Woodworking Co., Apr. 1995, pp. 1–3, and 10–12.

*Primary Examiner*—Peter M. Cuomo
*Assistant Examiner*—Stephen Vu
*Attorney, Agent, or Firm*—Emch, Schaffer, Schaub & Porcello Co., L.P.A.

[57] ABSTRACT

A drawer assembly including a drawer back having a first end, a second end, a top end, a bottom end and a drawer back inner surface. The first end defines a first tongue. The second end defines a second tongue. The assembly further includes a first drawer side having a first front portion, a first back portion, a first top portion, a first bottom portion and a first drawer side inner surface. The first front portion defines a first front portion groove. The first back portion defines a first back portion groove. The first back portion groove receives the first tongue of the drawer back. The assembly includes a second drawer side having a second front portion, a second back portion, a second top portion, a second bottom portion and a second drawer side inner surface. The second front portion defines a second front portion groove. The second back portion defines a second back portion groove. The second back portion groove receives the second tongue of the drawer back. The assembly includes a drawer front having an outside surface and an inside surface. The assembly further includes a first drawer bracket having a first front member and a first side member. The first front member defines a first opening for receiving a first fastening device for attaching the first front member to the inside surface of the drawer front. The first side member defines a first bracket tongue. The first front portion groove of the first drawer side receives the first bracket tongue. A second drawer bracket having a second front member and a second side member is also included. The second front member defines a second opening for receiving a second fastening device for attaching the second front member to the inside surface of the drawer front. The second side member defines a second bracket tongue. The second front portion groove of the second drawer side receives the second bracket tongue.

10 Claims, 5 Drawing Sheets

DRAWER ASSEMBLY HAVING INTERLOCKING MEMBERS

BACKGROUND OF THE INVENTION

The present invention relates to a drawer assembly. More specifically the invention is directed to a drawer assembly that includes unique corner joints and bracket members.

Prior art drawer assemblies are known in the art. These drawer assemblies include a box having corners joined by threaded screws. A front panel is attached by screws to the drawer box. The process for assembling this type of prior art assembly is difficult and time consuming. It has been found that there is a need for a drawer assembly that is easily, quickly and efficiently assembled.

The present invention satisfies the above-identified need. The present invention is directed to a drawer assembly that includes a drawer back, first and second drawer sides and a drawer front that are joined by unique joints and brackets.

SUMMARY OF THE INVENTION

The present invention is directed to a drawer assembly including a drawer back having a first end, a second end, a top end, a bottom end and a drawer back inner surface. The first end defines a first tongue. The second end defines a second tongue.

The assembly further includes a first drawer side having a first front portion, a first back portion, a first top portion, a second bottom portion and a first drawer side inner surface. The first front portion defines a first front portion groove. The first back portion defines a first back portion groove. The first back portion groove receives the first tongue of the drawer back. A second drawer side has a second front portion, a second back portion, a second top portion, a second bottom portion and a second drawer side inner surface. The second front portion defines a second front portion groove. The second back portion defines a second back portion groove. The second back portion groove receives the second tongue of the drawer back. The present invention includes a drawer front having an outside surface and an inside surface. The invention also includes first and second drawer brackets. The first drawer bracket has a first front member and a first side member. The first front member defines a first opening for receiving a first fastening device for attaching the first front member to the inside surface of the drawer front. The first side member defines a first bracket tongue. The first front portion groove of the first drawer side receives the first bracket tongue. A second drawer bracket has a second front member and a second side member. The second front member defines a second opening for receiving a second fastening device for attaching the second front member to the inside surface of the drawer front. The second side member defines a second bracket tongue. The second front portion groove of the second drawer side receives the second bracket tongue. A drawer bottom is adjacent the drawer back, the first and second drawer sides and the drawer front.

It is the primary object of the present invention to provide a drawer assembly that is easily and efficiently assembled through the use of unique corner joints and brackets.

Other objects and advantages of the invention shall become apparent to one skilled in the art upon a review of the following detailed description of the preferred embodiment and the accompanying drawings.

DETAILED DESCRIPTION OF THE PREFERRED EMBODIMENT

Figure 1:
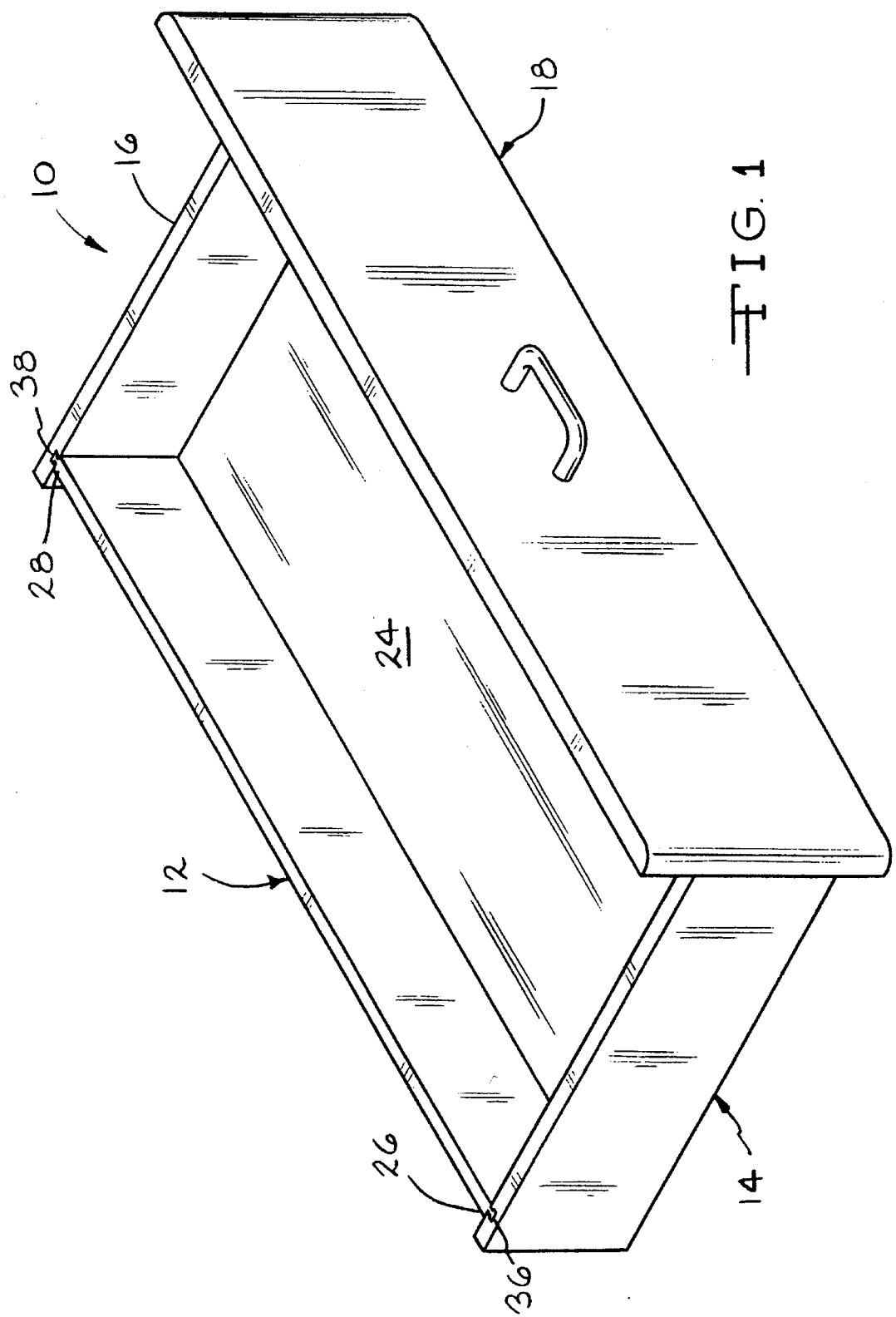
FIG. 1 is a perspective view of the drawer assembly according to the present invention.
Figure 2:
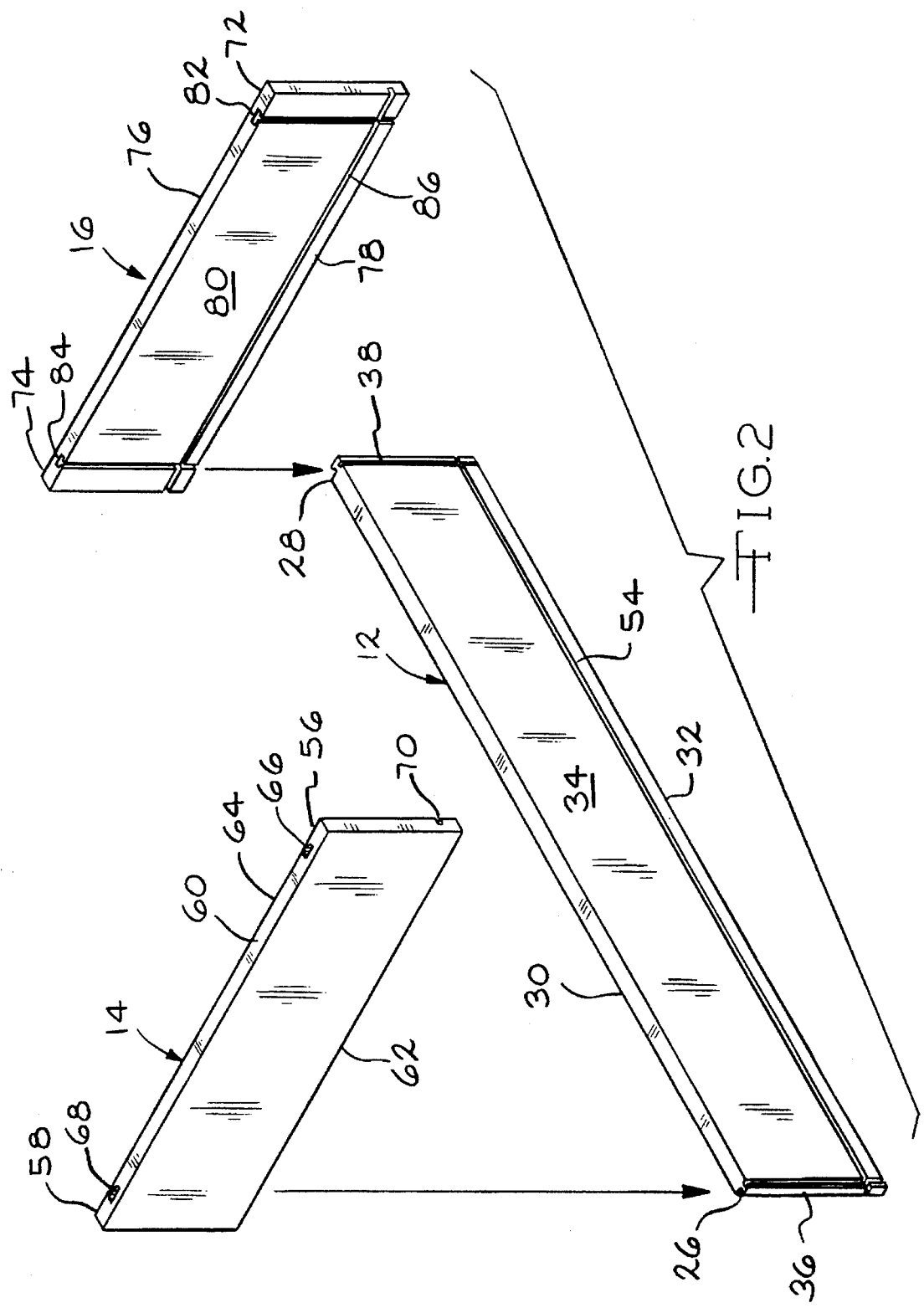
FIG. 2 is a perspective view showing the first and second drawer sides being joined to the drawer back.
Figure 3:
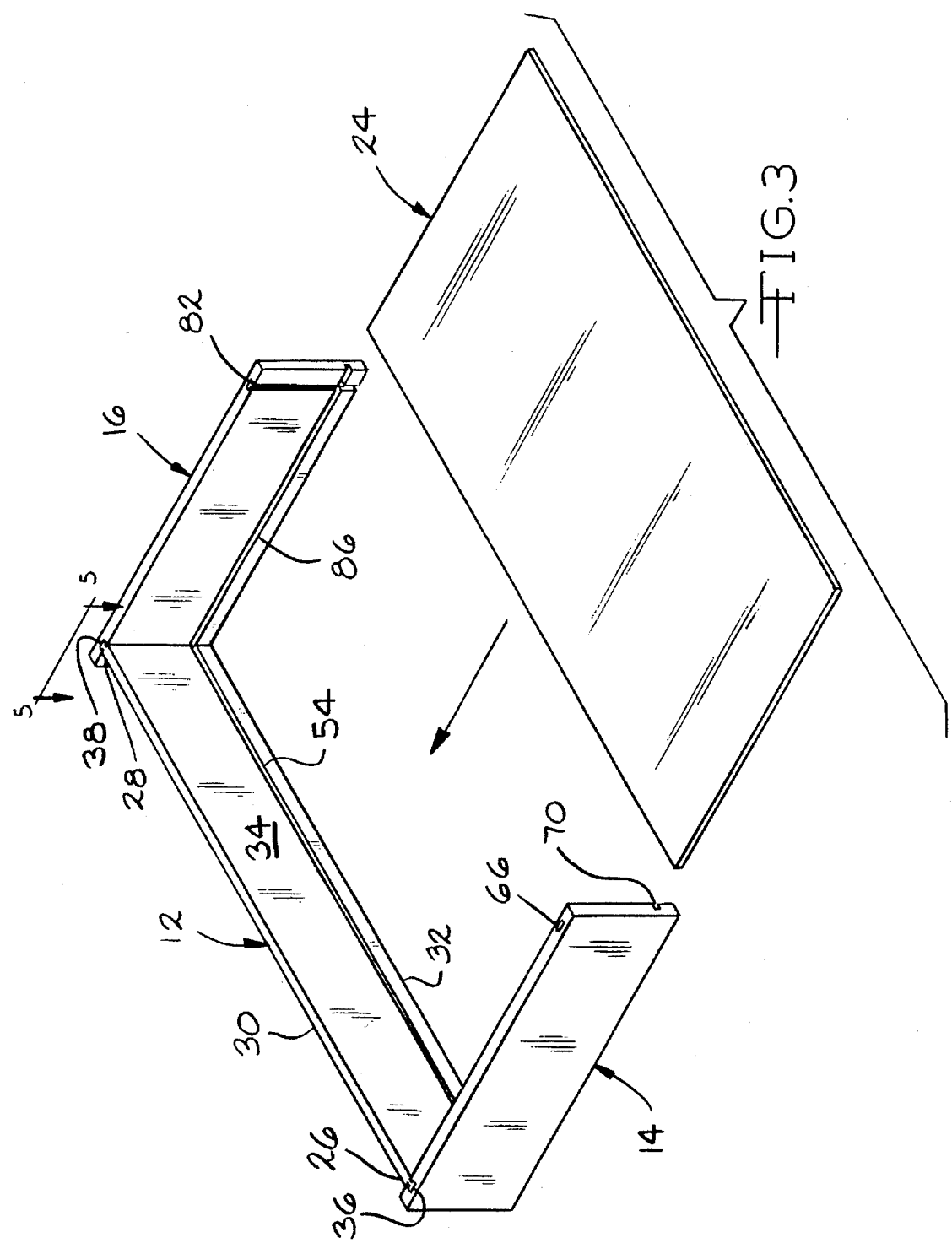
FIG. 3 is a perspective view showing the drawer bottom being positioned in the slots defined by the first and second drawer sides and the drawer back.
Figure 4:
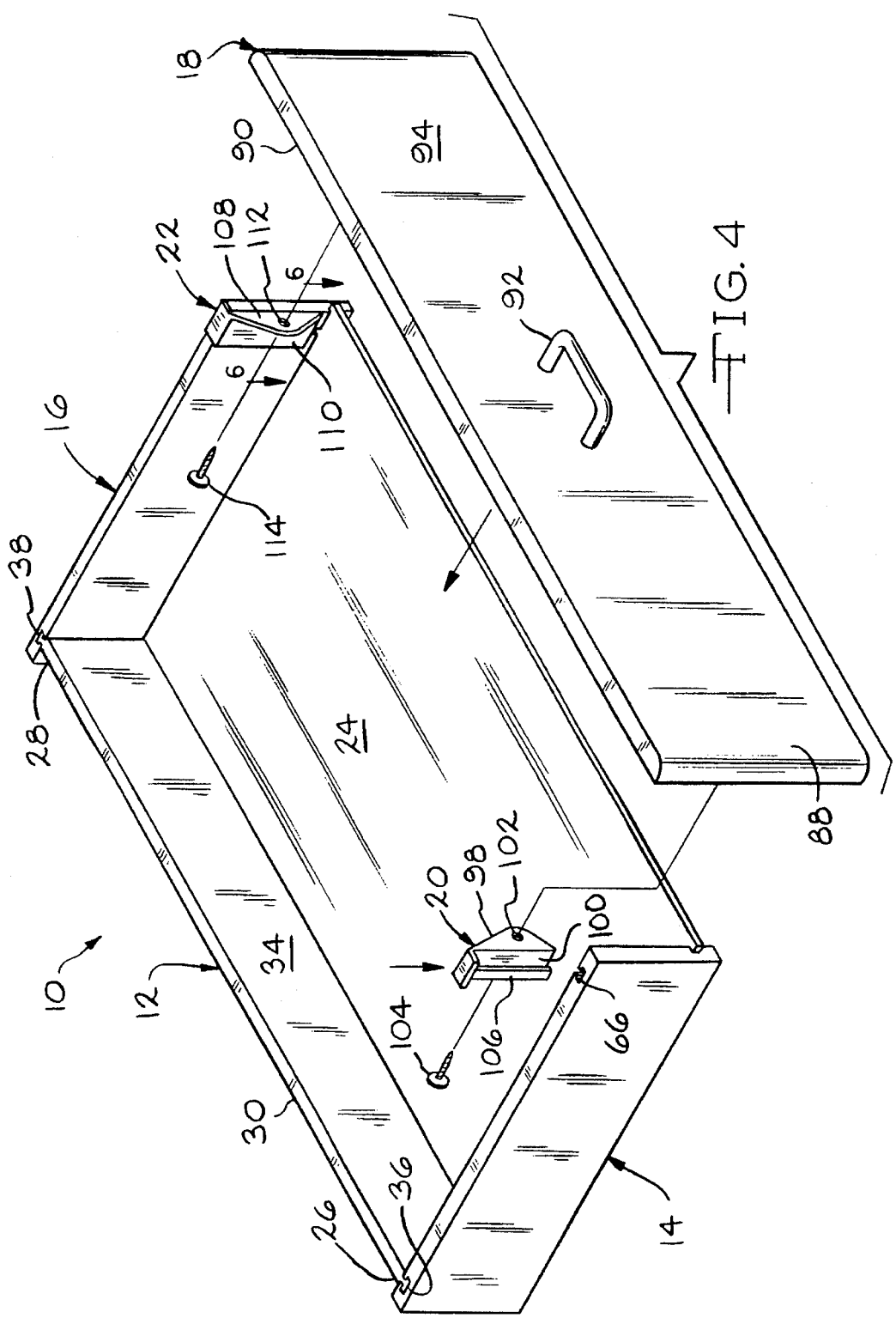
FIG. 4 is a perspective view showing the drawer front being attached to the first and second drawer sides by the first and second drawer brackets.
Figure 5:
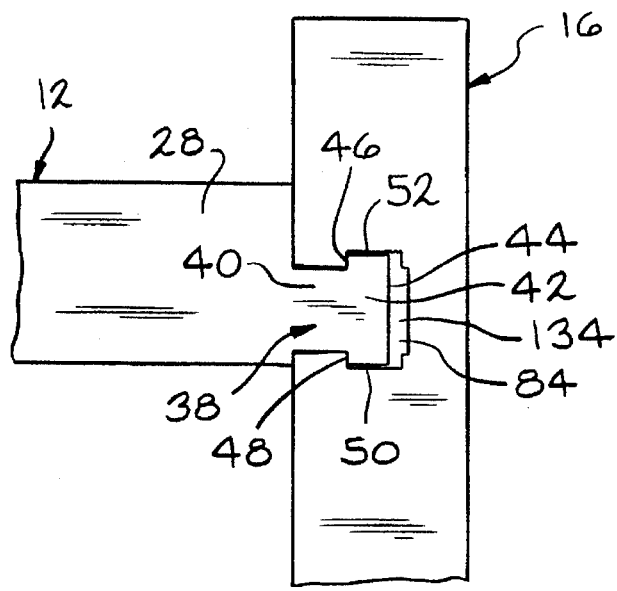
FIG. 5 is a cross-sectional view taken along line 5—5 of FIG. 3.

The preferred embodiment and best mode of the present invention shall now be described in detail with reference to the accompanying drawings. The drawer assembly of the present invention is indicated generally in the drawings by the reference number "10". Referring to FIGS. 1 and 4, the assembly 10 of the present invention generally includes a drawer back 12, a first drawer side 14, a second drawer side 16, a drawer front 18, a first drawer bracket 20, a second drawer bracket 22 and a drawer bottom 24. As shown in FIG. 2, the drawer back 12 has a first end 26, a second end 28, a top end 30, a bottom end 32 and a drawer back inner surface 34. The first end 26 defines a first tongue 36. The second end 28 defines a second tongue 38. Referring to FIG. 5, each of the first and second tongues includes a central portion 40 and a single terminal portion 42. The terminal portion 42 includes a front wall 44, two opposed back walls 46 and 48, a first side wall 50 and an opposed second side wall 52. The front wall 44 is parallel to the back walls 46 and 48. The first side wall 50 is parallel to the second side wall 52. The front wall 44 and the back walls 46 and 48 are perpendicular to the first and second side walls 50 and 52. The respective walls of the terminal portion 42 form a geometric configuration. In the preferred embodiment, the geometric configuration is a rectangle. However, other geometric configurations, such as a square, can also be formed. As shown in FIG. 3, the drawer back inner surface 34 defines a longitudinally extending slot 54 adjacent the bottom end 32 for receiving the drawer bottom 24.

Referring to FIG. 2, the first drawer side 14 has a first front portion 56, a first back portion 58, a first top portion 60, a first bottom portion 62 and a first drawer side inner surface 64. The first front portion 56 defines a first front portion groove 66. The first back portion 58 defines a first back portion groove 68. The first back portion groove 68 receives the first tongue 36 of the drawer back 12. The first back portion groove 68 has a shape corresponding to the shape of the first tongue 36. The first back portion groove 68 receives the first tongue 36 to join the drawer back 12 to the first drawer side 14. The first drawer side inner surface 64 defines a longitudinally extending slot 70 for receiving the drawer bottom 24. The slot 70 is positioned adjacent the first bottom portion 62.

Still referring to FIG. 2, the assembly 10 further includes a second drawer side 16 having a second front portion 72, a second back portion 74, a second top portion 76, a second bottom portion 78 and a second drawer side inner surface 80.

The second front portion 72 defines a second front portion groove 82. The second back portion 74 defines a second back portion groove 84. The second back portion groove 84 receives the second tongue 38 of the drawer back 12. The second back portion groove 84 has a shape corresponding to the shape of the second tongue 38. The second back portion groove 84 receives the second tongue 38 to join the drawer back 12 to the second drawer side 16. The second drawer side inner surface 80 defines a longitudinally extending slot 86 for receiving the drawer bottom 24. The slot 86 is positioned adjacent the second bottom portion 78.

Figure 6:
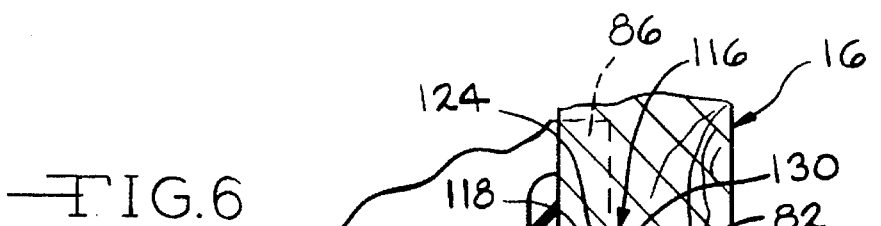
FIG. 6 is a cross-sectional view taken along line 6—6 of FIG. 4.

Referring to FIG. 4, the drawer front 18 has an outside surface 88 and an inside surface 90. The outside surface 88 of the drawer front 18 can include a handle, such as the U-shaped handle 92 shown in FIG. 4. The handle 92 is mounted to the drawer front 18 by threaded screws (not shown) that extend from the inside surface 90 to the handle 92. The outside surface 88 can include a decorative laminate 94. The decorative laminate 94 can include a variety of colors, shapes and textures. The decorative laminate 94 can have a solid color appearance or a wood grain appearance depending on the application. As shown in FIG. 6, the inside surface 90 of the drawer front 18 can include a longitudinally extending slot 96 for receiving the drawer bottom 24.

Referring to FIGS. 4 and 6, the first drawer bracket 20 has a first front member 98 and a first side member 100. The first front member 98 defines a first opening 102 for receiving a first fastening device, such as a first threaded screw 104. The first threaded screw 104 attaches the first front member 98 to the inside surface 90 of the drawer front 18. The first side member 100 defines a first bracket tongue 106. The first front portion groove 66 of the first drawer side 14 receives the first bracket tongue 106. Still referring to FIGS. 4 and 6, the second drawer bracket 22 has a second front member 108 and a second side member 110. The second front member 108 defines a second opening 112 for receiving a second fastening device, such as a second threaded screw 114. The second threaded screw 114 attaches the second front member 108 to the inside surface 90 of the drawer front 18. The second side member 110 defines a second bracket tongue 116. The second front portion groove 82 of the second drawer side 16 receives the second bracket tongue 116.

Referring to FIG. 6, each of the first and second bracket tongues 106 and 116 includes a bracket central portion 118 and a single bracket terminal portion 120. The terminal portion 120 includes a bracket front wall 122, two opposed bracket back walls 124 and 126, a first bracket side wall 128 and an opposed second bracket side wall 130. The bracket front wall 122 is parallel to the bracket back walls 124 and 126. The first bracket side wall 128 is parallel to the second bracket side wall 130. The front and back bracket walls 122, 124 and 126 are perpendicular to the first and second bracket side walls 128 and 130. The bracket terminal portion 120 has a geometric configuration. In the preferred embodiment, the geometric configuration is a rectangle. However, a variety of geometric configurations can be used, such as a square, depending on the application. The first and second front portion grooves 66 and 82 have shapes corresponding to the first and second bracket tongues 106 and 116, respectively. The first and second front portion grooves 66 and 82 receive the first and second bracket tongues 106 and 116 to join the first and second drawer brackets 20 and 22 to the first and second drawer sides 14 and 16, respectively. As shown in FIGS. 5 and 6, the grooves 82 and 84, as well as corresponding grooves 66 and 68 on the first drawer side 14, can define spaces 132 and 134, respectively, for receiving such objects as attachment inserts of drawer slides (not shown).

The drawer back 12, the first drawer side 14, the second drawer side 16, the drawer front 18 and the drawer bottom 24 can be made of a variety of materials depending on the application. For example, they can be made of wood or a wood by-product, such as composite board or particle board. The first and second drawer brackets 20 and 22 can be made of a variety of materials. For example, the brackets can be made of plastic or metal, with plastic being preferred.

Referring to FIGS. 2 through 4, the method of assembling the drawer assembly 10 of the present invention will be described. As shown in FIG. 2, the first back portion groove 68 of the first drawer side 14 receives the first tongue 36 of the drawer back 12. The second back portion groove 84 of the second drawer side 16 receives the second tongue 38 of the drawer back 12. As shown in FIG. 3, the drawer bottom 24 is positioned in the slots 54, 70 and 86 of the drawer back 12, first drawer side 14 and second drawer side 16, respectively. The positioning of the drawer bottom 24 acts as a "lock" to prevent the drawer back 12, the first drawer side 14 and the second drawer side 16 from moving with respect to one another. This locking action prevents the first and second tongues 36 and 38 from being removed from the first and second back portion grooves 68 and 84. As shown in FIG. 4, the first and second drawer brackets 20 and 22 are attached to the first and second drawer sides 14 and 16, respectively, by insertion of the first and second bracket tongues 106 and 116 into the first and second front portion grooves 66 and 82, respectively. The drawer front 18 is then attached to the first and second drawer brackets 20 and 22 by first and second threaded screws 104 and 114. The threaded screws 104 and 114 engage the inside surface 90 of the drawer front 18, The slot 96 defined by the inside surface 90 of the drawer front 18, as shown in FIG. 6, engages the drawer bottom 24 to lock the drawer front in place. The fully assembled drawer assembly 10 is shown in FIG. 1. It has been found that the drawer assembly 10 of the present invention is a major improvement over prior art drawer assemblies. The present invention provides a drawer assembly that can easily, quickly and efficiently be assembled.

While the invention has been described with reference to a preferred embodiment, it should be understood by those skilled in the art that various changes may be made and equivalents may be substituted for elements thereof without departing from the central scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

We claim:

1. A drawer assembly comprising:
   a drawer back having a first end, a second end, a top end, a bottom end and a drawer back inner surface, said first end defining a first tongue, said second end defining a second tongue;
   a first drawer side having a first front portion, a first back portion, a first drawer side inner surface, said first front portion defining a first front portion groove, said first back portion defining a first back portion groove, said first back portion groove receiving said first tongue of said drawer back;
   a second drawer side having a second front portion, a second back portion, a second top portion, a second bottom portion and a second drawer side inner surface, said second front portion defining a second front portion groove, said second back portion defining a second back portion groove, said second back portion groove receiving said second tongue of said drawer back;

a drawer front having an outside surface and an inside surface;

a first drawer bracket having a first front member and a first side member, said first front member defining a first opening for receiving first fastening means for attaching said first front portion to said inside surface of said drawer front, said first side member defining a first bracket tongue;

a second drawer bracket having a second front member and a second side member, said second front member defining a second opening for receiving second fastening means for attaching said second front portion to said inside surface of said drawer front, said second side member defining a second bracket tongue;

each of said first and second bracket tongues including a bracket central portion and a single bracket terminal portion including a bracket front wall, two opposed bracket back walls, a first bracket side wall and an opposed second bracket side wall, said bracket front wall being substantially parallel to said bracket back walls, said first bracket side wall being substantially parallel to said second bracket side wall, said front and back bracket walls being substantially perpendicular to said first and second bracket side walls, said bracket terminal portion having a first geometric configuration, said first and second front portion grooves having shapes corresponding to said first and second bracket tongues, respectively, whereby said first and second front portion grooves receive said first and second bracket tongues to join said first and second drawer brackets to said first and second drawer sides.

2. The drawer assembly of claim 1, wherein said drawer back inner surface, said first drawer side inner surface, said second drawer side inner surface and said inside surface of said drawer front each defines a longitudinally extending slot, said slots receiving a drawer bottom.

3. The drawer assembly of claim 1, wherein each of said first and second tongues of said drawer back includes a central portion and a single terminal portion including a front wall, two opposed back walls, a first side wall and an opposed second side wall, said front wall being substantially parallel to said back walls, said first side wall being substantially parallel to said second side wall, said front and back walls being substantially perpendicular to said first and second side walls, said terminal portion having a second geometric configuration, said first and second back portion grooves having shapes corresponding to said first and second tongues, respectively, whereby said first and second back portion grooves receive said first and second tongues to join said drawer back to said first and second drawer sides.

4. The drawer assembly of claim 3, wherein said second geometric configuration is a rectangle.

5. The drawer assembly of claim 3, wherein said second geometric configuration is a square.

6. The drawer assembly of claim 1, wherein said drawer front includes handle means.

7. The drawer assembly of claim 6, wherein said handle means consists of a U-shaped handle mounted on said outside surface of said drawer front.

8. The drawer assembly of claim 1, wherein said outside surface of said drawer front includes a decorative laminate.

9. The drawer assembly of claim 1, wherein said first geometric configuration is a rectangle.

10. The drawer assembly of claim 1, wherein said first geometric configuration is a square.

* * * * *